(12) United States Patent
Isogawa et al.

(10) Patent No.: US 6,936,093 B2
(45) Date of Patent: Aug. 30, 2005

(54) ELECTRONIC ENCLOSURE FILTER

(75) Inventors: Katsushi Isogawa, Eagan, MN (US); Carl J. Soldner, Apple Valley, MN (US); Kristin Fischer, Burnsville, MN (US); Vijay K. Garikipati, Eagan, MN (US); James P. Hand, Lakeville, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 10/375,950

(22) Filed: Feb. 27, 2003

(65) Prior Publication Data

US 2004/0168575 A1 Sep. 2, 2004

(51) Int. Cl.[7] .......................... B03C 3/155; B01D 46/12; B01D 53/04
(52) U.S. Cl. .................................. 96/55; 96/58; 96/121; 96/132; 96/135; 96/147; 96/153; 96/154; 55/385.6
(58) Field of Search ............................. 55/385.1, 385.6, 55/385.7; 96/55, 57, 58, 121, 147, 131–136, 153, 154

(56) References Cited

U.S. PATENT DOCUMENTS

| 4,401,447 | A | * | 8/1983 | Huber ........................ 96/133 |
| 4,756,726 | A | * | 7/1988 | Peace ........................ 96/117.5 |
| 4,889,542 | A | * | 12/1989 | Hayes ........................ 95/285 |
| 4,911,739 | A | * | 3/1990 | Cullen et al. ................. 96/133 |
| 4,913,942 | A | * | 4/1990 | Jick ............................ 96/121 |
| 4,957,521 | A | * | 9/1990 | Cullen et al. ................. 96/133 |
| 5,417,743 | A | * | 5/1995 | Dauber ........................ 96/13 |
| 5,593,482 | A | * | 1/1997 | Dauber et al. .............. 96/117.5 |
| 5,676,718 | A | * | 10/1997 | Davison et al. ............. 55/385.6 |
| 5,766,285 | A | * | 6/1998 | Killman ...................... 55/385.6 |
| 5,837,039 | A | * | 11/1998 | LeConey et al. .............. 96/121 |
| 5,869,009 | A | * | 2/1999 | Bellefeuille et al. ......... 422/171 |
| 5,891,223 | A | * | 4/1999 | Shaw et al. ................... 96/134 |
| 5,912,369 | A | * | 6/1999 | Reeves ...................... 55/385.1 |
| 5,980,616 | A | * | 11/1999 | Johnson et al. ............... 96/135 |
| 5,987,915 | A | * | 11/1999 | Incorvia et al. ............... 62/474 |
| 5,996,371 | A | * | 12/1999 | Riemenschneider ......... 62/474 |
| 5,997,618 | A | * | 12/1999 | Schneider et al. ............. 96/135 |
| 6,077,335 | A | * | 6/2000 | Schneider et al. ............. 96/135 |
| 6,083,303 | A | * | 7/2000 | LeConey et al. .............. 96/121 |
| 6,146,446 | A | * | 11/2000 | Tuma et al. ................... 95/90 |
| 6,168,651 | B1 | * | 1/2001 | Tuma et al. ................... 95/90 |
| 6,238,467 | B1 | * | 5/2001 | Azarian et al. ............... 96/135 |
| 6,395,073 | B1 | * | 5/2002 | Dauber ........................ 96/134 |

(Continued)

FOREIGN PATENT DOCUMENTS

| DE | 41 29 069 A1 | * | 3/1992 |
| EP | 0295054 A2 | * | 12/1988 |
| GB | 2063095 A | * | 6/1981 |
| WO | WO 01/41901 A1 | | 6/2001 |

*Primary Examiner*—Robert H. Spitzer
(74) *Attorney, Agent, or Firm*—Merchant & Gould P.C.

(57) ABSTRACT

A multilayer filter assembly for use inside an electronic enclosure, such as a hard disk drive enclosure containing a rotating disk, is disclosed. The filter assembly provides filtration of air entering the enclosure, as well as air circulating within the enclosure. The filter assembly is generally a single-piece unit that can be formed without a rigid frame, thus allowing the filter assembly to be produced at a reduced cost. In one implementation of the invention, the multilayer filter assembly contains at least two particulate removal layers covering, enclosing, and dividing at least two adsorbent regions. One of the adsorbent regions is configured to be placed flush against an interior wall of the electronic enclosure to allow air to flow in and out of the enclosure, while the other adsorbent region is configured to be placed in an upright position in the enclosure with exposed surfaces that allow airflow through this portion of the filter assembly.

21 Claims, 4 Drawing Sheets

U.S. PATENT DOCUMENTS

| | | | |
|---|---|---|---|
| 6,398,830 B1 * | 6/2002 | Rhodes et al. | 55/385.1 |
| 6,419,729 B1 * | 7/2002 | Duffy et al. | 96/17 |
| 6,475,269 B1 * | 11/2002 | Turner | 96/134 |
| 6,491,741 B2 * | 12/2002 | Tuma et al. | 95/90 |
| 6,530,982 B1 * | 3/2003 | Incorvia et al. | 96/147 |
| 6,533,835 B2 * | 3/2003 | Wilson et al. | 55/481 |
| 6,709,498 B2 * | 3/2004 | Tuma | 96/134 |
| 6,726,745 B2 * | 4/2004 | Tuma et al. | 95/90 |
| 2001/0035094 A1 * | 11/2001 | Takagaki et al. | 96/154 |
| 2002/0004107 A1 | 1/2002 | Rogers | |
| 2002/0131200 A1 | 9/2002 | Tomioka | |

\* cited by examiner

ELECTRONIC ENCLOSURE FILTER

FIELD OF THE INVENTION

The present invention relates to filters and to methods for making and using filters. More particularly, the invention is directed to filters for use in preventing contamination from entering electronic enclosures and for use in removing contamination from within electronic enclosures.

BACKGROUND OF THE INVENTION

Hard disk drives and other electronic equipment are often sealed within enclosures to provide a clean environment that is necessary for optimal operation of the equipment. For example, hard disk drives normally contain at least one inflexible platter or disk coated with magnetic material that is positioned within an enclosure. The disk is rapidly spun and a magnetic read/write head "flies" a few microns above it in order to access or store data. The magnetic head rides on an air cushion, and it is desirable to position the head as close as possible to the disk without touching it in order to provide a high capacity drive.

Contaminants, including particles, gases, and liquids within the hard disk drive enclosure can act to reduce the efficiency and longevity of the hard drive. These contaminants can gradually damage the drive, cause deterioration in performance, and in certain situations can even cause sudden, complete failure of it. Contaminants can either enter the electronic enclosure from an external source or be generated from within the enclosure during use. Common sources of contaminants in disk drives include leaks, which may or may not be intentional, the manufacturing environment, which can contain certain contaminants, and the materials incorporated into the disk drive which give off particulates and gases.

One particular concern regarding electronic enclosures is that contaminants from outside of the electronic enclosure should be prevented from entering the enclosure. These contaminants can be of particular significance because temperature fluctuations in the enclosure will often cause the exchange of air with the exterior environment. If particulate or chemical contaminants are present in this exchanged air, the interior of the enclosure will become contaminated. Another particular concern regarding electronic enclosures is that organic vapors and other contaminants can be generated inside electronic enclosures during normal operating conditions. For example, when the temperature exceeds 150° F., organic acids and organic vapors can be formed that damage electronic components. Such temperatures can be achieved by simply leaving the computer in the trunk of a car on a hot day. It is important that these contaminants generated within the enclosure be efficiently captured or removed in order to prevent deterioration of the electronic equipment.

Therefore, a need exists for a filter for use in an electronic enclosure, in particular a filter that prevents contaminants from entering the enclosure and also removes contaminants that are present within the enclosure.

SUMMARY OF THE INVENTION

The present invention is directed to a filter assembly for use inside an electronic enclosure, such as a hard disk drive enclosure containing a rotating disk. The filter assembly provides filtration of air entering the enclosure, as well as air circulating within the enclosure. The filter assembly is generally a single-piece unit that can be formed without a rigid frame, thus allowing the filter assembly to be produced at a reduced cost. Also, the assembly allows installation in an electronic enclosure with reduced labor and materials cost.

In one implementation of the invention the multilayer filter assembly contains at least two particulate removal layers at least partially covering and at least partially enclosing two adsorbent regions. One of the adsorbent regions is configured to be placed flush against an interior wall of the electronic enclosure while the other adsorbent region is configured to be placed in an upright position in the enclosure with exposed surfaces that permit or enhance airflow through this portion of the filter assembly. Typically the same particulate removal layers surround both adsorbent regions and are sealed along their edges as well as between the two adsorbent regions. This configuration provides an economically manufactured design by using at least some of the same materials to form both filter regions, while still allowing the filter regions to be configured and positioned to improve filter performance.

The particulate removal layers can include, for example, an electrostatic filter media. Also, in certain embodiments, a polymeric scrim may surround the adsorbent elements and function as the particulate filter. However, in general the polymeric scrim is used in addition to the particulate filter, such as the electrostatic filter media. The adsorbent regions normally contain an adsorbent carbon material that removes organic vapors. The adsorbent carbon may be, without limitation, in the form of beads, pellets, web, powder, or cloth.

The above summary of the present invention is not intended to describe each discussed embodiment of the present invention. This is the purpose of the figures and the detailed description that follows.

DRAWINGS

The invention may be more completely understood in connection with the following drawings, in which.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

The present invention is directed to a filter assembly for use inside an electronic enclosure, such as a hard disk drive enclosure containing a rotating disk. The filter assembly provides filtration of air entering the enclosure, as well as air circulating within the enclosure. The filter assembly is generally a single-piece unit that can be formed without a rigid frame, thus allowing the filter assembly to be produced at a reduced cost.

The filter assembly normally contains at least two particulate removal layers covering two adsorbent regions. One of the adsorbent regions is configured to be placed flush against an interior wall of the electronic enclosure while the other adsorbent region is configured to be placed in an upright position within the enclosure, with exposed surfaces that permit airflow through this portion of the filter assembly. Typically the particulate removal layers surround both adsorbent regions and are sealed along their edges as well as between the two adsorbent regions. This design provides an economical manufacturing process by using some of the same materials to form both filter regions, while still allowing the filter regions to be configured and positioned in a manner that improves filter performance.

Referring now to the figures, an embodiment of the invention is described in detail with reference to the drawings, wherein like reference numbers represent like parts and assemblies throughout the several views. The terms "adsorb", "adsorbing", "adsorbent", and the like are to be understood to encompass both adsorption and absorption phenomena and materials. Although other fluids may be filtered by the filter assembly, the filtration of contaminants from air will be used as an illustration.

I. Filter Construction

Figure 1:
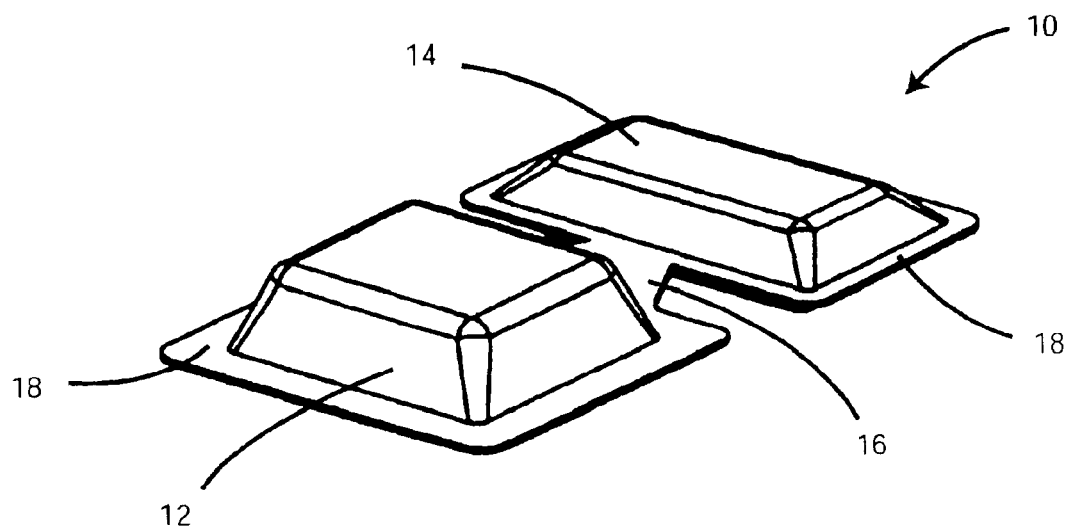
FIG. 1 is a top perspective view of a multilayer filter assembly constructed and arranged in accordance with the invention, showing the filter assembly before installation in an electronic enclosure.

Referring to FIG. 1, a perspective view is shown of a filter assembly 10 constructed in accordance with the present invention. Filter assembly 10 includes a breather filter element 12 and a recirculation filter element 14 that are joined together along a joint 16. The breather filter element 12 is typically placed over a hole or port in an electronic enclosure and filters air passing through the port. The breather filter element 12 may also filter some of the contaminants present within the electronic enclosure.

Filter assembly 10 also includes, in the embodiment depicted, a sealed perimeter 18. This sealed perimeter 18 is normally formed from portions of the filter assembly 10 that have been thermally or ultrasonically sealed to create interior spaces within the filter elements 12, 14. Other methods of sealing the filter elements 12, 14 may also be used. The sealed perimeter 18 also generally is formed from some or all of the same materials as those used to form the joint 16.

Figure 2:
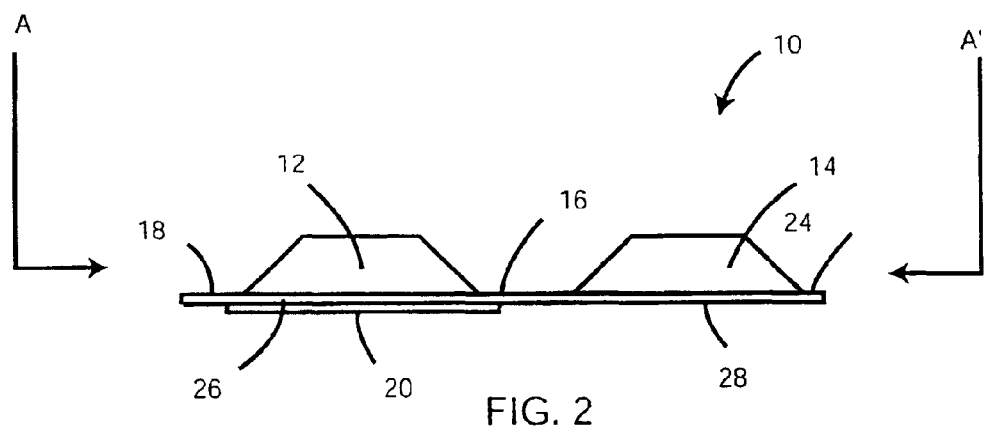
FIG. 2 is a side elevational view of a multilayer filter assembly constructed and arranged in accordance with the invention, showing the filter assembly before installation in an electronic enclosure.
Figure 3:
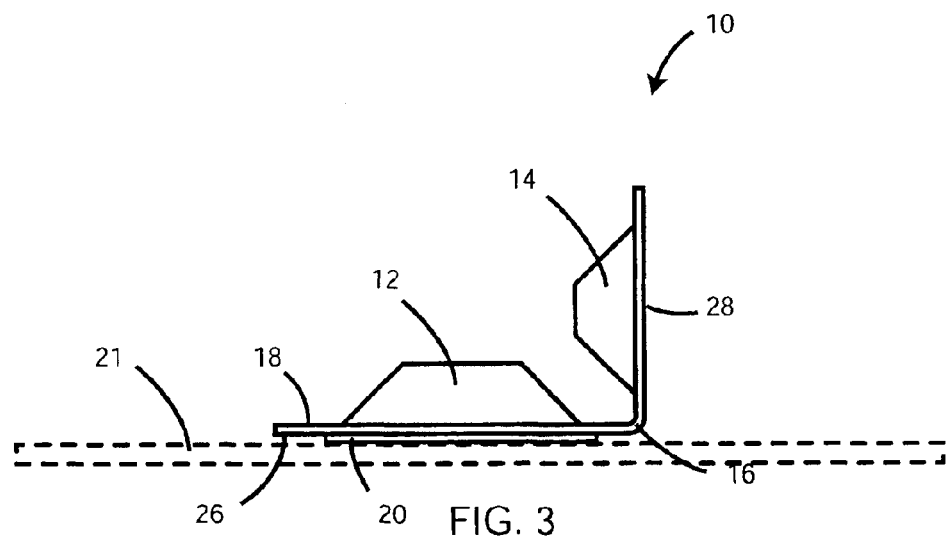
FIG. 3 is a side elevational view of a multilayer filter assembly constructed and arranged in accordance with the invention, showing the filter assembly after being installed in an electronic enclosure.

Additional aspects of filter assembly 10 are evident from FIGS. 2 and 3, which show side elevational views of a filter assembly 10 constructed in accordance with the invention. In FIG. 2 the filter assembly 10 is shown prior to typical installation in an electronic enclosure, while in FIG. 3 the filter assembly 10 is shown after a typical installation in an electronic enclosure. FIGS. 2 and 3 depict both filter elements 12 and 14, as well as joint 16 and perimeter 18. In addition, an adhesive composition 20 is shown in this implementation, the adhesive 20 configured for securing the filter assembly 10 to the inner wall 21 of an electronic enclosure (depicted in dotted lines in FIG. 3). Generally adhesive 20 is a pressure sensitive adhesive and is covered by a release liner during shipping or storage.

The adhesive 20 is joined to the bottom side 26 of the filter assembly. In general the top side 24 of the filter assembly is free of adhesive. However, in certain embodiments the top side 24 of the filter assembly 10 also contains an adhesive, such as to adhere the recirculation filter element 14 to a support member (not shown).

A significant change in the two configurations shown in FIGS. 2 and 3 is that, in the embodiment depicted, the recirculation filter element 14 is arranged after installation (in FIG. 3) at an angle of approximately 90 degrees relative to the breather filter element 12. The angle between the two filter elements 12, 14 can be measured, for example, as the angle formed between the bases 26, 28 forming the bottom side of each filter element. The filter assembly 10 normally is formed from multiple layers of conformable material (such as polyester scrim) and thus these bases 26, 28 are usually not entirely flat. However, even with this absence of complete flatness it is possible to determine a general angle between the bases.

The embodiment depicted in FIG. 3 shows the angle between the two filter elements as an approximate right angle of 90 degrees. Other angles that permit flow of air through filter element 14 are also suitable. The angle between the two elements 12, 14 should be such that both filter elements can function properly to remove contaminants entering the enclosure or contaminants entrapped or generated within the enclosure, respectively. Other suitable angles besides 90 degrees include, for example, between 75 and 105 degrees, between 60 and 120 degrees, between 45 and 135 degrees, and between 30 and 150 degrees. Under most implementations the angle is less than 180 degrees, but certain enclosure geometries can permit an angle of 180 degrees if adequate flow through the recirculation filter element 14 is accomplished, such as by having a space beneath the bottom 28 of the recirculation filter element 14 that permits airflow through the filter element 14 without bending the filter assembly 10.

Usually filter assembly 10 has just one breather filter element 12 and just one recirculation filter element 14, but in specific alternative implementations more than one breather element may be used and more than one recirculation element may be used. For example, it is possible to have one breather filtration element 12 with two opposing recirculation filtration elements 14 attached to two opposite edges of the breather filtration element 12. Also, it is possible to join the two elements 12, 14 by more than one joint 16. For example, it is possible to have two joints connecting the breather filtration element 12 to the recirculation filtration element 14.

Also, in certain implementations it is proper to have the absorbent material extend from the breather filter element 12 to the recirculation filter element 14 across joint 16. In such implementations the adsorbent material is generally flexible, such as an adsorbent cloth, or a particulate material. Also, in such implementations the filtration elements 12, 14 are defined by their orientation and placement (over the opening in the enclosure or at an angle to catch circulating air) rather than simply by a gap in the adsorbent material.

Figure 4:
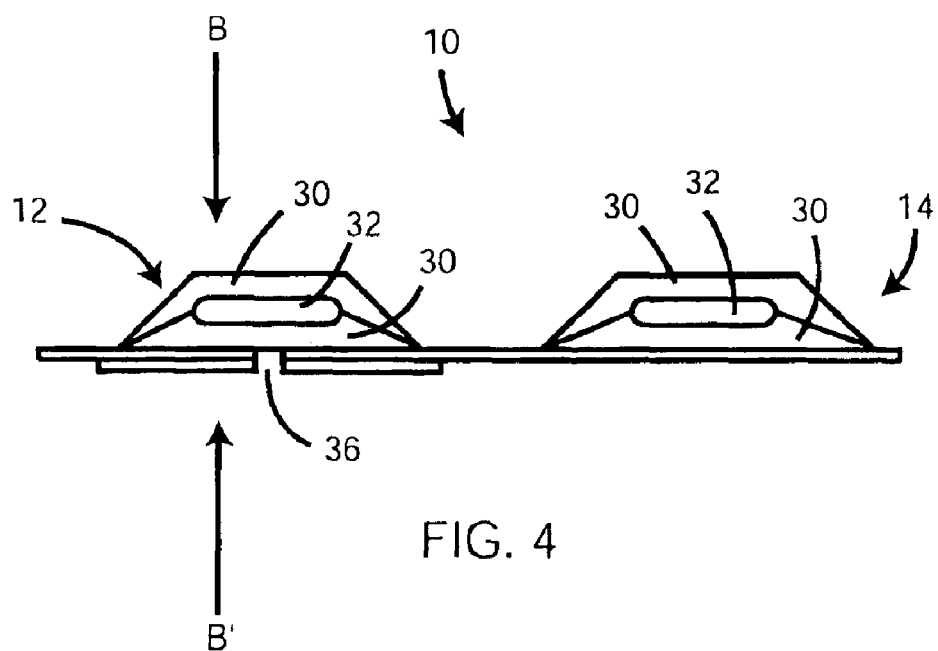
FIG. 4 is a side cross-sectional view of the multilayer filter assembly of FIG. 2, taken along lines A–A' of FIG. 2.
Figure 5:
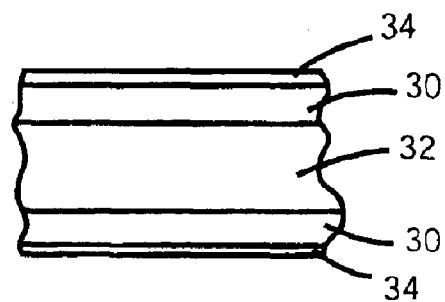
FIG. 5 is an enlarged cross-sectional view of a portion of the multilayer filter assembly of FIG. 4, taken along lines B–B' of FIG. 4.
Figure 6A:
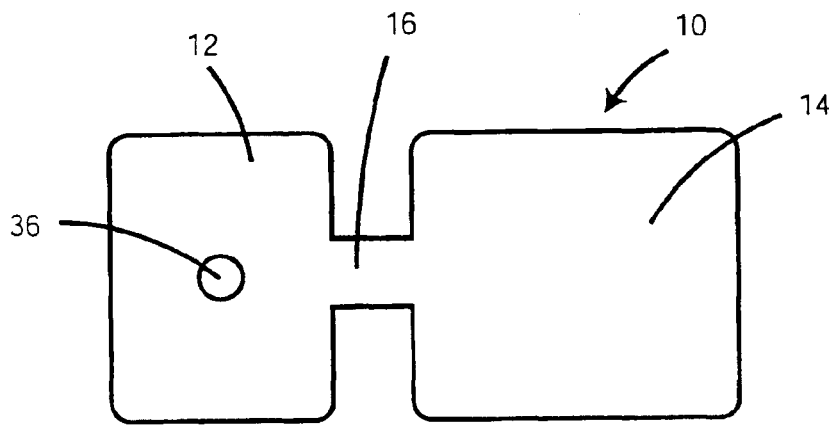
FIG. 6A is a bottom plan view of a filter constructed and arranged in accordance with a first implementation of the invention.
Figure 6B:
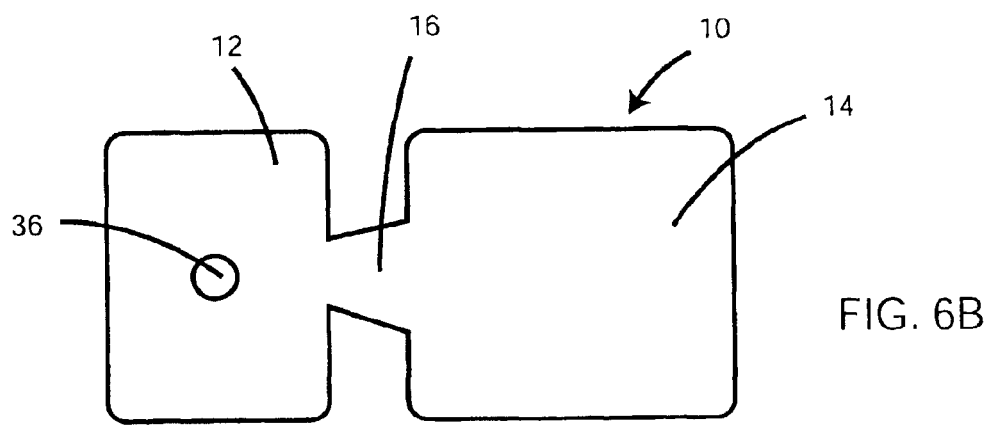
FIG. 6B is a bottom plan view of a filter constructed and arranged in accordance with a second implementation of the invention.
Figure 6C:
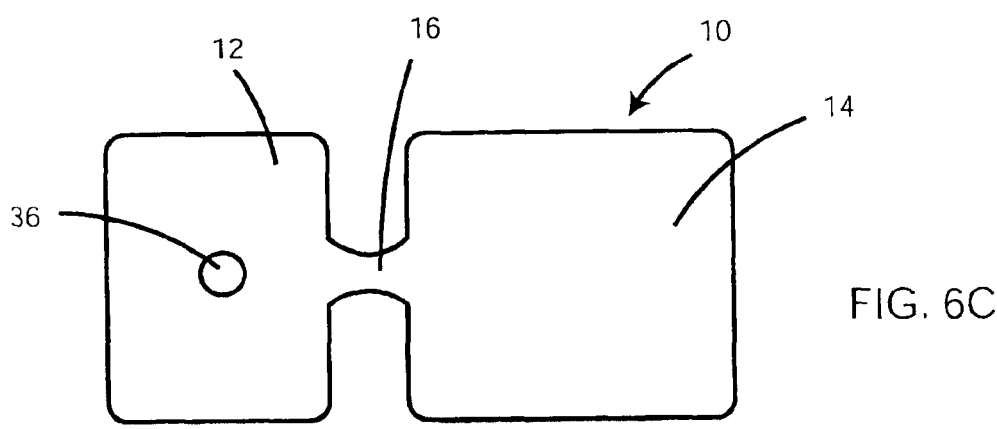
FIG. 6C is a bottom plan view of a filter constructed and arranged in accordance with a third implementation of the invention.

Reference is now made to FIGS. 4 and 5 which show a cross section of filter assembly 10 taken along lines A–A' of FIG. 2. Specifically, FIG. 4 shows the entire cross section of the filter assembly 10, while FIG. 5 shows an enlarged cross section of a portion of filter assembly 10, in particular a portion of the breather filter element 12. Referring first to FIG. 4, the interior components of the two filter elements 12, 14 are shown in greater detail. Each filter element contains at least one particulate absorptive layer 30 and at least one chemical adsorptive layer 32. The particulate absorptive layer or layers 30 remove and retain particulate contaminants, while the chemical adsorptive layer or layers 32 remove and retain non-particulate contaminants, such as acids and solvents. Activated carbon may be used to control humidity, as well as to remove chemical contaminants. The particulate absorptive layer can be, for example, a polymeric material containing an electrostatic composition. The chemical adsorptive layer is generally a carbon material, such as activated carbon beads, activated carbon cloth, activated carbon pellets, or other forms of adsorbents. The filter assembly 10 also normally contains one or more layers of a polymeric scrim 34 (such as a polyester scrim). A hole 36 connects the interior of the breather filter element 12 with the exterior of the enclosure through an opening in the enclosure In reference now to FIGS. 6A, 6B, and 6C, bottom plan views of three different filter assemblies 10 are shown with three different configurations for forming the joint 16 between the breather filtration element 12 and the recirculation filter element 14. Each figure shows a hole 36 in the adhesive layer that is typically aligned (or in fluid communication) with a hole in an enclosure. A diffusion channel may also be added to create a contaminant gradient or tortuous path with the exterior, thereby improving filter performance. The diffusion channel can be formed, for example, by adding an additional layer to the bottom of the filter elements or may be built into the enclosure itself. In FIG. 6A, joint 16 has a constant width between the two filtration elements 12, 14. In FIG. 6B, the joint 16 is constructed such that it is narrower near the breather filtration element 12 than near the recirculation filter element 14. This configuration generally results in preferential flexing of the joint nearest to the breather filter element 12. Referring now to FIG. 6C, the joint 16 is constructed with a narrowest portion approximately centrally located between the breather filtration element 12 and recirculation filtration element 14.

The filtration assembly can also have additional layers or fewer layers, as desired, and the layers can be different on the top and bottom. For example, the filtration assembly can be limited to an adsorbent material having a particulate absorptive layer on one side only, with an additional layer on the opposite side that prevents escape of the adsorbent material without substantially removing particulates. Also, when electrostatic materials are used to absorb particulates the electrostatic material is usually provided on two sides of the adsorbent material, but in certain embodiments the electrostatic material is provided on just one side of the adsorbent.

The adhesive layer may be, for example, a coating of an adhesive material on the housing or a double-sided adhesive tape (e.g., an adhesive carrier, such as a polymer film, with adhesive coated on two opposing surfaces). An opening may be formed in the adhesive layer, particularly if the adhesive layer is a double-sided adhesive tape, to permit fluid flow into the inlet opening and/or to fit around the extension. The release liner is typically a film, for example, a polymer film, which can be removed from the adhesive layer leaving most, and, preferably, all, of the adhesive layer disposed on the housing. The release liner may extend beyond the adhesive layer to allow for easy removal.

Additional description of the materials used to form the filter assembly of the invention will now be provided.

II. Particulate Removal Layer

Each filtration assembly 10 usually contains at least one particulate removal or filtration layer. The particulate removal layer can include, for example, electrostatic filter media. In certain embodiments a polymeric scrim may surround the adsorbent elements and function as the particulate filter. However, in general the polymeric scrim is used in addition to the particulate filter, such as the electrostatic filter media.

The particulate removal layer typically includes a porous polymer film made from, for example, polyethylene, polypropylene, polytetrafluoroethylene, modacrylic, or expanded polytetrafluoroethylene. The particulate removal layer generally prevents particulate material from entering or exiting the interior of the filter assembly 10.

The particulate removal layer can be made of any material commonly available for particulate filtration, and can have any thickness that provides suitable air flow values and particulate removal. Preferably, the thickness of each layer is normally between about 0.1 to 5 mm, more typically between about 0.15 to 1.0 mm, and can be between about 0.20 to 0.25 mm.

Advantageous particulate removal layers include those made of an electrostatic medium, or a polymer medium such as Teflon. A suitable electrostatic medium, for example, is a mixed fiber medium of 50% polypropylene and 50% modacrylic that exhibits a permanent electrical potential, having a Fomblin Efficiency of 76–94% average with no single value below 71 or above 99 (test at 10.5 ft./min. airflow, 0.3–0.4 micron particles); permeability of 200–476 ft./min.; thickness of 0.036–0.061 inches; and basis weight equivalent to 30–150 gm/m$^2$ (48–75 lbs./3000 ft.$^2$). An exemplary polymer medium is a Teflon fibrous membrane filter medium having a Fomblin Efficiency of 98.0% minimum (challenge solution is 50% Fomblin in Freon); a Frazier Permeability of 15.0 ft./min minimum average (all readings greater than 11.0 ft./min.); and a tensile strength of less than 7000 psi average over 5 samples.

III. Chemical Absorptive Element

In general at least one portion of the filter assembly includes an adsorptive element, typically a chemical adsorptive material containing carbon. Thus, at least a portion of the material used in the multilayer filtration article has adsorbent properties. The adsorbent material can include physisorbents and/or chemisorbents, such as desiccants (i.e., materials that adsorb or absorb water or water vapor) and/or materials that adsorb volatile organic compounds and/or acid gas. Acid gases can be generated inside an electronic enclosure, thus it is desirable to include an organic vapor removal layer impregnated with a chemical which provides enhanced acid gas removal. Exemplary chemicals which can be used to evaluate an impregnants ability to remove acid gas include hydrogen sulfide ($H_2S$), hydrochloric acid (HCl), chlorine gas ($Cl_2$), and the like.

Suitable adsorptive materials include, for example, activated carbon, activated alumina, molecular sieves, silica gel, potassium permanganate, calcium carbonate, potassium carbonate, sodium carbonate, calcium sulfate, or mixtures thereof. The adsorbent material may adsorb one or more types of contaminants, including, for example, water, water vapor, acid gas, and volatile organic compounds. Although the adsorbent material may be a single material, mixtures of materials are also useful. For typical operation, an adsorbent material that is stable and adsorbs within a temperature range of –40° C. to 100° C. is preferred. Carbon is suitable for most implementations, and carbon suitable for use with the present invention is disclosed in U.S. Pat. No. 6,077,335, incorporated herein by reference in its entirety.

The adsorbent material can be provided in the form of a granular material, a tablet, a sheet, or other suitable form. In certain embodiments the adsorbent material is a powder that is bound together. In such implementations the adsorbent material can be a powder (passes through 100 mesh) or granular material (28 to 200 mesh) prior to forming into a shaped adsorbent article. The binder is typically dry, powdered, and/or granular and can be mixed with the adsorbent. In some embodiments, the binder and adsorbent material are mixed using a temporary liquid binder and then dried. Suitable binders include, for example, microcrystalline cellulose, polyvinyl alcohol, starch, carboxyl methyl cellulose, polyvinylpyrrolidone, dicalcium phosphate dihydrate, and sodium silicate.

It will be appreciated that, although the implementation of the invention described above is directed to a hard drive enclosure, the present device may be used with other electronic enclosures, and is not limited to hard drive enclosures. In addition, while the present invention has been described with reference to several particular implementations, those skilled in the art will recognize that many changes may be made hereto without departing from the spirit and scope of the present invention.

We claim:

1. A multilayer filter assembly for use in an electronic enclosure, the filter assembly comprising at least:
   a first layer containing a particulate removal material;
   a second layer containing a particulate removal material;
   a third layer located between the first and second layers, the third layer comprising at least two discontinuous adsorbent regions held to one another by at least one of the first and second layers to form a first filter portion and a second filter portion, each of said first and second filter portions containing at least one of the discontinuous adsorbent regions; and
   an adhesive layer positioned along a major surface of the first layer of the first filter portion;
   wherein the first and second layers substantially surround the third layer; and
   wherein the adhesive layer permits mounting of the multilayer filter assembly within an electronic enclosure by securing the first layer of the first filter portion to a wall of an electronic enclosure.

2. The multilayer filter assembly of claim 1, wherein the first and second layers are joined together to contain and separate the two discontinuous adsorbent regions of the third layer.

3. The multilayer filter assembly of claim 1, further comprising an intermediate region between the two discontinuous adsorbent regions, this intermediate region providing a flexible joint between the two distinct adsorbent regions.

4. The multilayer filter assembly of claim 3, wherein the intermediate region is formed at least in part by the first layer and second layer.

5. The multilayer filter assembly of claim 3, wherein the flexible joint is constructed of varying widths in order to provide enhanced flexibility at a narrow width area.

6. The multilayer filter assembly of claim 1, wherein the first and second layers are at least in part held together by a thermal or ultrasonic weld.

7. The multilayer filter assembly of claim 1, wherein at least one region of the third layer contains activated carbon.

8. The multilayer filter assembly of claim 1, further comprising at least one electrostatic layer.

9. The multilayer filter assembly of claim 8, wherein at least the first layer comprises the electrostatic layer.

10. A multilayer filter assembly for use in an electronic enclosure, the filter assembly comprising:
    a first layer containing a particulate removal element;
    a second layer containing an electrostatic filter element;
    a third layer comprising at least first and second adsorbent regions containing adsorbent material; and
    a fourth layer comprising an adhesive material;
    wherein the first and second layers provide at least partial retention of the adsorbent material, wherein the four layers are configured to permit substantial bending of the filter assembly at a point between the two adsorbent regions, and wherein the adhesive material permits mounting of the filter assembly over a breather hole in an electronic enclosure such that the first adsorbent region is in fluid communication with gases entering the electronic enclosure through the breather hole and the second adsorbent region is in fluid communication with air circulating within the electronic enclosure.

11. The multilayer filter assembly of claim 10, wherein the bending permits at least a 30 degree angle change between the two adsorbent regions.

12. The multilayer filter assembly of claim 10, wherein the first and second layers substantially surround the third layer.

13. A multilayer filter assembly for use in an electronic enclosure, the filter assembly comprising:
    a first filtering portion configured and arranged for placement over an opening in the electronic enclosure; the first filtering portion including an adhesive layer for securing the first filtering portion over the opening; and
    a second filtering portion configured and arranged for filtering air circulating in the electronic enclosure;
    wherein the first and second filtering portions are integrally formed and joined together along a flexible joint configured to allow the first and second filtering portions to be installed in the electronic enclosure at an angle of less than 180 degrees to one another.

14. The multilayer filter assembly of claim 13, wherein the first and second filtering portions contain at least two layers of filtering material, and at least one of these layers forms at least a part of the flexible joint.

15. The multilayer filter assembly of claim 13, wherein each of the first and second filtering portions contains a first particulate removal layer, a second particulate removal layer, and an adsorbent region.

16. The multilayer filter assembly of claim 15, wherein the adsorbent regions in each of the filtering portions are distinct from one another.

17. The multilayer filter assembly of claim 13, wherein each of the first and second filtering portions contains electrostatic filter media.

18. A multilayer filter assembly for use in an electronic enclosure, the filter assembly comprising:
    a first filtering portion configured and arranged for placement over an opening in an electronic enclosure;
    a second filtering portion configured and arranged for filtering air circulating in the electronic enclosure; and
    the first and second filtering portions positioned within a cover containing a unitary first layer and a unitary second layer, the two layers bonded along their edges such that the first and second filtering portions are contained and separated from one another;
    wherein the first filtering portion further comprises an adhesive layer configured for securing the first filtering portion in place, said adhesive layer further restricting airflow through the first filtering portion.

19. The multilayer filter assembly of claim 18, wherein at least one of the unitary first layer and unitary second layers comprises an electrostatic media.

20. The multilayer filter assembly of claim 18, wherein the first and second filtering portions are joined by a flexible joint.

21. The multilayer filter assembly of claim 20, wherein the flexible joint is formed at least in part by at least one of the first layer and second layer.

* * * * *